United States Patent
Rueger et al.

(10) Patent No.: US 6,573,637 B2
(45) Date of Patent: Jun. 3, 2003

(54) APPARATUS AND METHOD FOR DETECTING A LOAD DECREASE WHEN DRIVING PIEZOELECTRIC ELEMENTS

(75) Inventors: Johannes-Jörg Rueger, Vaihingen/enz (DE); Udo Schulz, Vaihingen/enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/825,547

(22) Filed: Apr. 2, 2001

(65) Prior Publication Data

US 2002/0030418 A1 Mar. 14, 2002

(30) Foreign Application Priority Data

Apr. 1, 2000 (EP) .............................................. 00106964

(51) Int. Cl.[7] .............................................. H01L 41/09
(52) U.S. Cl. .................... 310/316.03; 310/319
(58) Field of Search .............................. 310/316.03, 319

(56) References Cited

U.S. PATENT DOCUMENTS 5,376,854 A  12/1994 Oouchi ................. 310/316.01

FOREIGN PATENT DOCUMENTS

| DE | 197 29 844 | 1/1999 | .......... F02M/51/00 |
| DE | 197 42 073 | 3/1999 | .......... F02M/51/06 |
| DE | 198 10 525 | 9/1999 | .......... H02N/2/06 |
| EP | 0 371 469 | 6/1990 | .......... H01L/41/04 |
| EP | 0 379 182 | 7/1990 | .......... H01L/41/08 |
| JP | 06 146976 | 5/1994 | .......... F02D/41/20 |
| WO | WO 99/67527 | 12/1999 | .......... F02M/15/00 |

Primary Examiner—Thomas M. Dougherty
(74) Attorney, Agent, or Firm—Kenyon & Kenyon

(57) ABSTRACT

The invention describes a method and an apparatus for detecting a load decrease when driving a piezoelectric element, for example, used as an actuator in a fuel injection system of an internal combustion engine. The method and apparatus are characterized in that an error signal is generated when the piezoelectric element reaches a target voltage more quickly than a predetermined minimum time interval during a charging or discharging operation.

20 Claims, 5 Drawing Sheets

APPARATUS AND METHOD FOR DETECTING A LOAD DECREASE WHEN DRIVING PIEZOELECTRIC ELEMENTS

The present invention relates to an apparatus as defined in the preamble of claim 1, and a method as defined in the preamble of claim 9, i.e. an apparatus and method for detecting a load decrease when driving piezoelectric elements.

Piezoelectric elements can be used as actuators because, as is known, they possess the property of contracting or expanding as a function of a voltage applied thereto or occurring therein.

The practical implementation of actuators using piezoelectric elements proves to be advantageous in particular if the actuator in question must perform rapid and/or frequent movements.

The use of piezoelectric elements as actuators proves to be advantageous, inter alia, in fuel injection nozzles for internal combustion engines. Reference is made, for example, to EP 0 371 469 B1 and to EP 0 379 182 B1 regarding the usability of piezoelectric elements in fuel injection nozzles.

Piezoelectric elements are capacitative elements which, as already partially alluded to above, contract and expand in accordance with the particular charge state or the voltage occurring therein or applied thereto. In the example of a fuel injection nozzle, expansion and contraction of piezoelectric elements is used to control valves that manipulate the linear strokes of injection needles. The use of piezoelectric elements with double acting, double seat valves to control corresponding injection needles in a fuel injection system is shown in German Applications DE 197 42 073 A1 and DE 197 29 844 A1, which are incorporated herein in their entirety.

Fuel injection systems using piezoelectric elements, e.g. as actuators, are characterized by the fact that, to a first approximation, piezoelectric elements exhibit a proportional relationship between applied voltage and the linear expansion. In a fuel injection nozzle, for example, implemented as a double acting, double seat valve to control the linear stroke of a needle for fuel injection into a cylinder of an internal combustion engine, the amount of fuel injected into a corresponding cylinder is a function of the time the valve is open, and in the case of the use of a piezoelectric element as an actuator, the activation voltage applied to the piezoelectric element.

FIG. 1 is a schematic representation of a fuel injection system using a piezoelectric element 2010 as an actuator. Referring to FIG. 1, the piezoelectric element 2010 is electrically energized to expand and contract in response to a given activation voltage. The piezoelectric element 2010 is coupled to a piston 2015. In the expanded state, the piezoelectric element 2010 causes the piston 2015 to protrude into a hydraulic adapter 2020 which contains a hydraulic fluid, for example fuel. As a result of the piezoelectric element's expansion, a double acting control valve 2025 is hydraulically pushed away from hydraulic adapter 2020 and the valve plug 2035 is extended away from a first closed position 2040. The combination of double acting control valve 2025 and hollow bore 2050 is often referred to as double acting, double seat valve for the reason that when piezoelectric element 2010 is in an unexcited state, the double acting control valve 2025 rests in its first closed position 2040. On the other hand, when the piezoelectric element 2010 is fully extended, it rests in its second closed position 2030. The later position of valve plug 2035 is schematically represented with ghost lines in FIG. 1.

The fuel injection system comprises an injection needle 2070 allowing for injection of fuel from a pressurized fuel supply line 2060 into the cylinder (not shown). When the piezoelectric element 2010 is unexcited or when it is fully extended, the double acting control valve 2025 rests respectively in its first closed position 2040 or in its second closed position 2030. In either case, the hydraulic rail pressure maintains injection needle 2070 at a closed position. Thus, the fuel mixture does not enter into the cylinder (not shown). Conversely, when the piezoelectric element 2010 is excited such that double acting control valve 2025 is in the so-called mid-position with respect to the hollow bore 2050, then there is a pressure drop in the pressurized fuel supply line 2060. This pressure drop results in a pressure differential in the pressurized fuel supply line 2060 between the top and the bottom of the injection needle 2070 SO that the injection needle 2070 is lifted allowing for fuel injection into the cylinder (not shown).

It is important to determine and apply an activation voltage with sufficient precision such that, for example, a corresponding valve plug is accurately positioned at the appropriate time in the fuel injection cycle. Thus it is important to be able to detect various problems in the electrical circuit driving the piezoelectric elements. One such problem is a short circuit to the battery voltage within, or at the terminals of, one or more of the piezoelectric elements.

It is therefore an object of the present invention to develop the apparatus as defined in the preamble of claim 1 and the method as defined in the preamble of claim 9 to reliably detect a drop in the electrical load of one or more of the piezoelectric elements.

This object is achieved, according to the present invention, by way of the features claimed in the characterizing portion of claim 1 (apparatus) and in the characterizing portion of claim 9 (method).

These provide for:
an error signal is generated when a target voltage is reached more quickly than a predetermined minimum time interval; and for
applying a circuit to a piezoelectric element to charge or discharge it to a target voltage, then monitoring how quickly the target voltage is reached, and finally generating an error signal when the target voltage is reached more quickly than a predetermined minimum time interval.

Because the electrical load of a piezoelectric element is capacitive in nature, the voltage across the load cannot change instantaneously. Rather, the voltage across the capacitive load will increase as a function of the current applied to the piezoelectric element over time. This process of increasing the voltage across the piezoelectric element is referred to as "charging." Similarly, the capacitive load must "discharge," or decrease, its voltage as a function of time, as current is drawn from the piezoelectric element.

When the load of a piezoelectric element drops, the measured voltage reaches the applied "desired" voltage much more quickly than expected.

Thus, it has been determined, according to the present invention, that a load drop of a piezoelectric element can be detected by monitoring whether an applied "desired" voltage across the piezoelectric element is reached in less than a predetermined minimum amount of time. If such voltage is reached in less.than the minimum amount of time a signal is generated to indicate that a load drop has occurred for that piezoelectric element. Such signal can be used to initiate countermeasures that may be necessary or to facilitate troubleshooting, for example, in the repair shop, or for storing an error message in an electronic memory.

Advantageous developments of the present invention are evident from the dependent claims, the description below, and the figures.

The invention will be explained below in more detail with reference to exemplary embodiments, referring to the figures in which.

Figure 1:
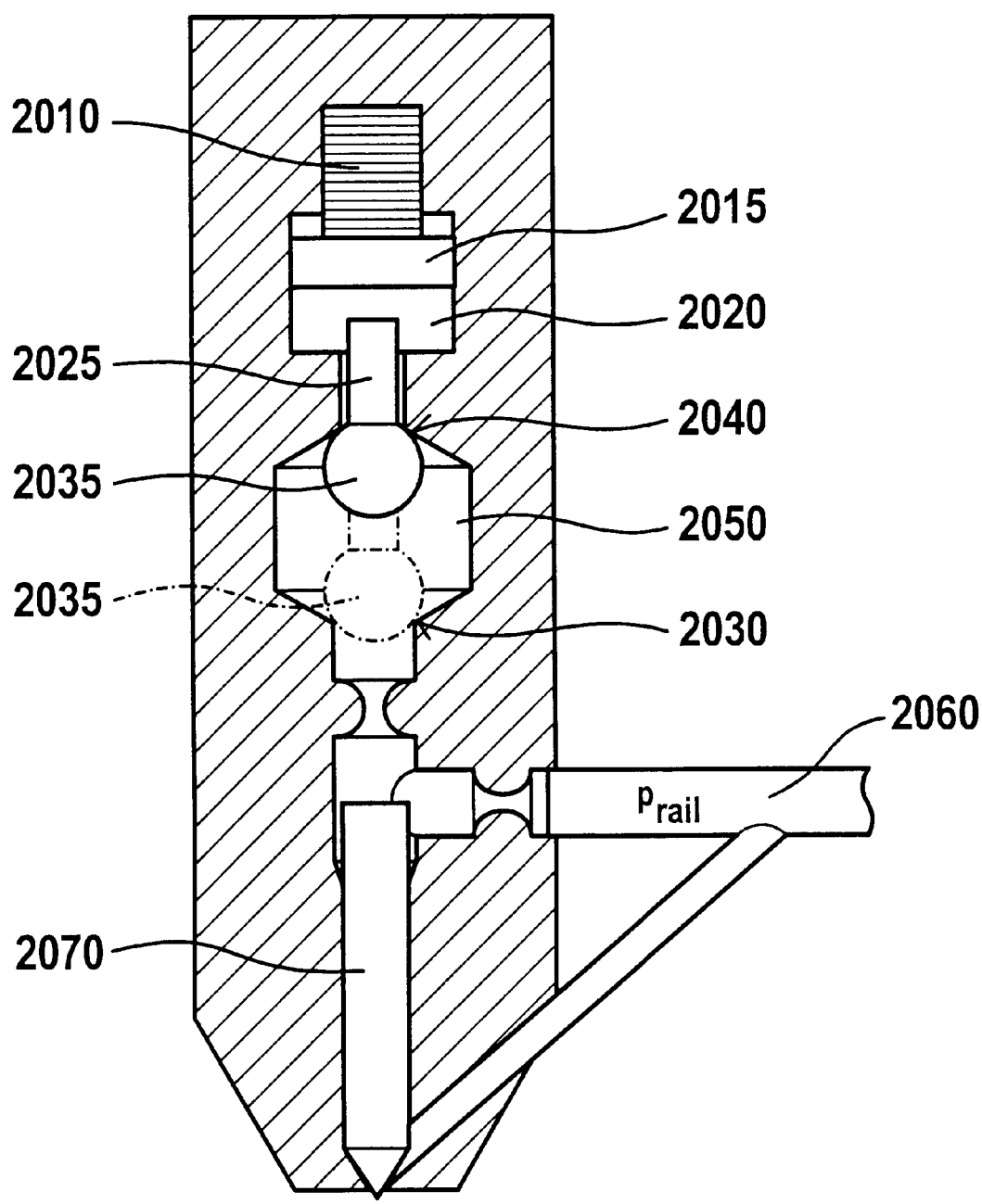
FIG. 1 shows a schematic representation of a fuel injection system using a piezoelectric element as an actuator.
Figure 2:
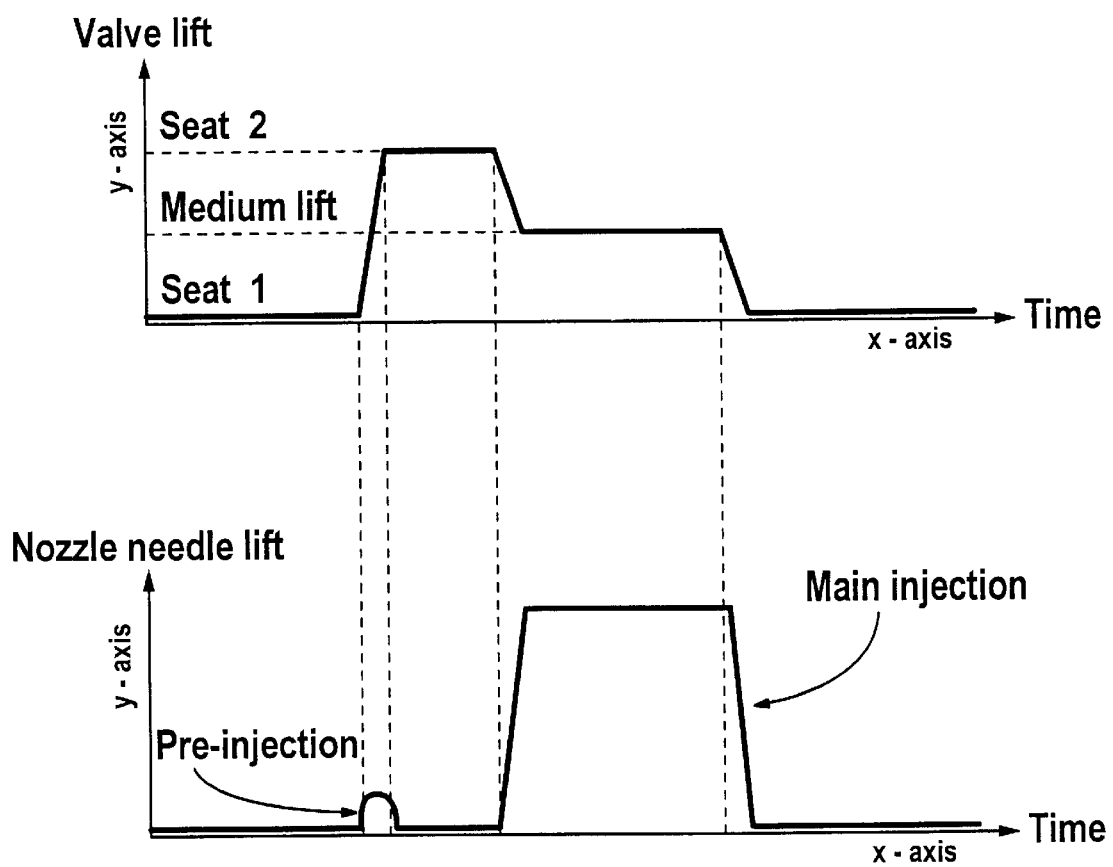
FIG. 2 shows a schematic profile of an exemplary control valve stroke.

FIG. 2 shows a double graph representing a schematic profile of an exemplary control valve stroke, to illustrate the operation of a double acting control valve. In the upper graph of FIG. 2, the x-axis represents time, and the y-axis represents displacement of the valve plug (valve lift). In the lower graph of FIG. 2, the x-axis once again represents time, while the y axis represents a nozzle needle lift to provide fuel flow, resulting from the valve lift of the upper graph. The upper and lower graphs are aligned with one another to coincide in time, as represented by the respective x-axises.

Figure 3:
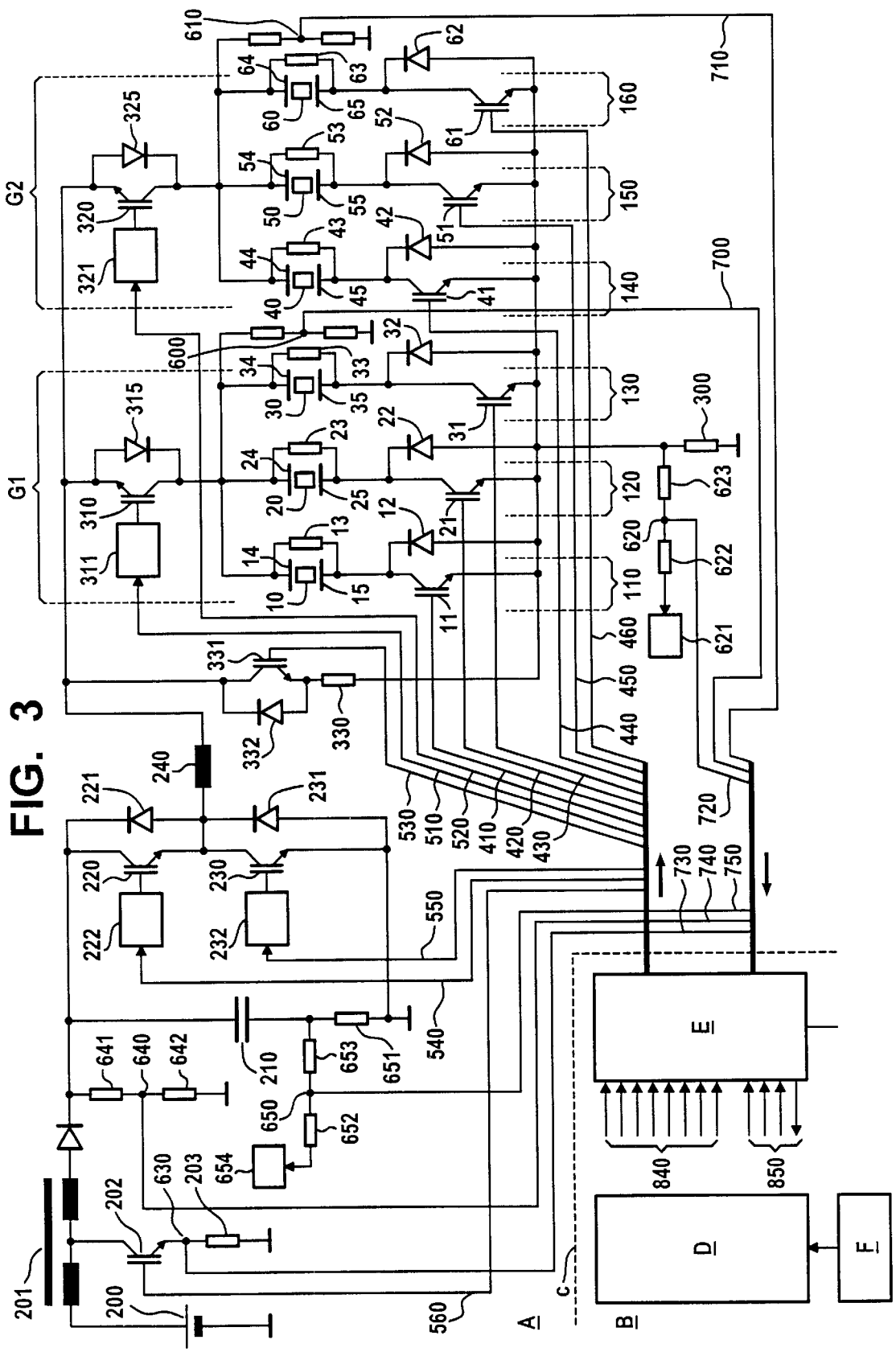
FIG. 3 shows a block diagram of an exemplary embodiment of an arrangement in which the present invention may be implemented.

During an injection cycle, the piezoelectric element is charged resulting in an expansion of the piezoelectric element, as will be described in greater detail, and causing the corresponding valve plug to move from the first closed position to the second closed position for a pre-injection stroke, as shown in the upper graph of FIG. 2. The lower graph of FIG. 3 shows a small injection of fuel that occurs as the valve plug moves between the two seats of the double acting control valve, opening and closing the valve as the plug moves between the seats.

In general, the charging of the piezoelectric element can be done in two steps. The first step is to charge the element to a certain voltage causing the valve to open. The second step is to further charge the element causing the valve to close again as the valve plug comes into contact with the second seat. Between both steps a time delay may be employed.

After a preselected period of time, a discharging operation is then performed, as will be explained in greater detail below, to reduce the charge within the piezoelectric element so that it contracts, as will also be described in greater detail, causing the valve plug to move away from the second closed position, and hold at a point between the two seats. The activation voltage within the piezoelectric element is to reach a value that equals $U_{opt}$ to correspond to a maximum fuel flow during the period of time allocated to a main injection. The upper and lower graphs of FIG. 2 show the holding of the valve lift at a intermediary point, resulting in a main fuel injection.

At the end of the period of time for the main injection, the piezoelectric element is discharged to an activation voltage of zero, resulting in further contraction of the piezoelectric element, to cause the valve plug to move away from the intermediary position, towards the first closedposition, closing the valve and stopping fuel flow, as shown in the upper and lower graphs of FIG. 2. At this time, the valve plug will once again be in a position to repeat another pre-injection, main injection cycle, as just described above, of course, any other injection cycle can be performed.

FIG. 3 provides a block diagram of an exemplary embodiment of an arrangement in which the present invention may be applied.

In FIG. 3 there is a detailed area A and a non-detailed area B, the separation of which is indicated by a dashed line c. The detailed area A comprises a circuit for charging and discharging piezoelectric elements 10, 20, 30, 40, 50 and 60. In the example being considered these piezoelectric elements 10, 20, 30, 40, 50 and 60 are actuators in fuel injection nozzles (in particular in so-called common rail injectors) of an internal combustion engine. Piezoelectric elements can be used for such purposes because, as is known, and as discussed above, they possess the property of contracting or expanding as a function of a voltage applied thereto or occurring therein. The reason to take six piezoelectric elements 10, 20, 30, 40, 50 and 60 in the embodiment described is to independently control six cylinders within a combustion engine; hence, any other number of piezoelectric elements might be suitable for any other purpose.

The non-detailed area B comprises a control unit D and a activation IC E by both of which the elements within the detailed area A are controlled, as well as a measuring system F for measuring system characteristics. Activation IC E receives various measurements of voltages and currents from throughout the rest of the piezoelectric element driving circuit. According to the present invention, the control unit D and activation IC E are programmed to control activation voltages and the activation timing for the piezoelectric elements. The control unit D and/or activation IC E are also programmed to monitor various voltages and currents throughout the piezoelectric element driving circuit.

In particular, according to the present invention, the voltages at the piezoelectric elements are monitored over time to determine how quickly an applied desired voltage occurs across the piezoelectric element from the time that the respective charging or discharging switches are activated by the activation IC E. If the desired voltage occurs more quickly than a preset minimum time stored in memory, a signal will be generated identifying that a load drop has occurred for the piezoelectric element. The control unit D may be programmed to subsequently refrain from future cycling of the faulty piezoelectric element. Further, a signal for diagnostic and repair purposes may be provided and an entry may be made into the error memory of the activation IC E.

The following description firstly introduces the individual elements within the detailed area A. Then, the procedures of charging and discharging piezoelectric elements 10, 20, 30, 40, 50, 60 are described in general. Finally, the ways both procedures are controlled and monitored by means of control unit D and activation IC E, according to the present invention, are described in detail.

The circuit within the detailed area A comprises six piezoelectric elements 10, 20, 30, 40, 50 and 60.

The piezoelectric elements 10, 20, 30, 40, 50 and 60 are distributed into a first group G1 and a second group G2, each comprising three piezoelectric elements (i.e. piezoelectric elements 10, 20 and 30 in the first group G1 resp. 40, 50 and 60 in the second group G2). Groups G1 and G2 are constituents of circuit parts connected in parallel with one another. Group selector switches 310, 320 can be used to establish which of the groups G1, G2 of piezoelectric elements 10, 20 and 30 resp. 40, 50 and 60 will be discharged in each case by a common charging and discharging apparatus (however, the group selector switches 310, 320 are meaningless for charging procedures, as is explained in further detail below).

The group selector switches 310, 320 are arranged between a coil 240 and the respective groups G1 and G2 (the coil-side terminals thereof) and are implemented as transistors. Side drivers 311, 321 are implemented which transform control signals received from the activation IC E into voltages which are eligible for closing and opening the switches as required.

Diodes 315 and 325 (referred to as group selector diodes), respectively, are provided in parallel with the group selector switches 310, 320. If the group selector switches 310, 320 are implemented as MOSFETs or IGBTs, for example, these group selector diodes 315 and 325 can be constituted by the parasitic diodes themselves. The diodes 315, 325 bypass the group selector switches 310, 320 during charging procedures. Hence, the functionality of the group selector switches 310, 32D is reduced to select a group G1, G2 of piezoelectric elements 10, 20 and 30, resp. 40, 50 and 60 for a discharging procedure only.

Within each group G1 resp. G2 the piezoelectric elements 10, 20 and 30, resp. 40, 50 and 60 are arranged as constituents of piezo branches 110, 120 and 130 (group G1) and 140, 150 and 160 (group G2) that are connected in parallel. Each piezo branch comprises a series circuit made up of a first parallel circuit comprising a piezoelectric element 10, 20, 30, 40, 50 resp. 60 and a resistor 13, 23, 33, 43, 53 resp. 63 (referred to as branch resistors) and a second parallel circuit made up of a selector switch implemented as a transistor 11, 21, 31, 41, 51 resp. 61 (referred to as branch selector switches) and a diode 12, 22, 32, 42, 52 resp. 62 (referred to as branch diodes).

The branch resistors 13, 23, 33, 43, 53 resp. 63 cause each corresponding piezoelectric element 10, 20, 30, 40, 50 resp. 60 during and after a charging procedure to continuously discharge themselves, since they connect both terminals of each capacitive piezoelectric element 10, 20, 30, 40, 50, resp. 60 one to another. However, the branch resistors 13, 23, 33, 43, 53 resp. 63 are sufficiently large to make this procedure slow compared to the controlled charging and discharging procedures as described below. Hence, it is still a reasonable assumption to consider the charge of any piezoelectric element 10, 20, 30, 40, 50 or 60 as unchanging within a relevant time after a charging procedure (the reason to nevertheless implement the branch resistors 13, 23, 33, 43, 53 and 63 is to avoid remaining charges on the piezoelectric elements 10, 20, 30, 40, 50 and 60 in case of a breakdown of the system or other exceptional situations). Hence, the branch resistors 13, 23, 33, 43, 53 and 63 may be neglected in the following description.

The branch selector switch/branch diode pairs in the individual piezo branches 110, 120, 130, 140, 150 resp. 160, i.e. selector switch 11 and diode 12 in piezo branch 110, selector switch 21 and diode 22 in piezo branch 120, and so on, can be implemented using electronic switches (i.e. transistors) with parasitic diodes, for example MOSFETs or IGBTs (as stated above for the group selector switch/diode pairs 310 and 315 resp. 320 and 325).

The branch selector switches 11, 21, 31, 41, 51 resp. 61 can be used to establish which of the piezoelectric elements 10, 20, 30, 40, 50 or 60 will be charged in each case by a common charging and discharging apparatus: in each case, the piezoelectric elements 10, 20, 30, 40, 50 or 60 that are charged are all those whose branch selector switches 11, 21, 31, 41, 51 or 61 are closed during the charging procedure which is described below. Usually, at any time, only one of the branch selector switches will be closed.

The branch diodes 12, 22, 32, 42, 52 and 62 serve for bypassing the branch selector switches 11, 21, 31, 41, 51 resp. 61 during discharging procedures. Hence, in the example considered for charging procedures any individual piezoelectric element can be selected, whereas for discharging procedures either the first group G1 or the second group G2 of piezoelectric elements 10, 20 and 30 resp. 40, 50 and 60 or both have to be selected.

Returning to the piezoelectric elements 10, 20, 30, 40, 50 and 60 themselves, the branch selector piezo terminals 15, 25, 35, 45, 55 resp. 65 may be connected to ground either through the branch selector switches 11, 21, 31, 41, 51 resp. 61 or through the corresponding diodes 12, 22, 32, 42, 52 resp. 62 and in both cases additionally through resistor 300.

The purpose of resistor 300 is to measure the currents that flow during charging and discharging of the piezoelectric elements 10, 20, 30, 40, 50 and 60 between the branch selector piezo terminals 15, 25, 35, 45, 55 resp. 65 and the ground. A knowledge of these currents allows a controlled charging and discharging of the piezoelectric elements 10, 20, 30, 40, 50 and 60. In particular, by closing and opening charging switch 220 and discharging switch 230 in a manner dependent on the magnitude of the currents, it is possible to set the charging current and discharging current to predefined average values and/or to keep them from exceeding or falling below predefined maximum and/or minimum values as is explained in further detail below.

In the example considered, the measurement itself further requires a voltage source 621 which supplies a voltage of 5 V DC, for example, and a voltage divider implemented as two resistors 622 and 623. This is in order to prevent the activation IC E (by which the measurements are performed) from negative voltages which might otherwise occur on measuring point 620 and which cannot be handled be means of activation IC E: such negative voltages are changed into positive voltages by means of addition with a positive voltage setup which is supplied by said voltage source 621 and voltage divider resistors 622 and 623.

The other terminal of each piezoelectric element 10, 20, 30, 40, 50 and 60, i.e. the group selector piezo terminal 14, 24, 34, 44, 54 resp. 64, may be connected to the plus pole of a voltage source via the, group selector switch 310 resp. 320 or via the group selector diode 315 resp. 325 as well as via a coil 240 and a parallel circuit made up of a charging switch 220 and a charging diode 221, and alternatively or additionally connected to ground via the group selector switch 310 resp. 320 or via diode 315 resp. 325 as well as via the coil 240 and a parallel circuit made up of a discharging switch 230 or a discharging diode 231. Charging switch 220 and discharging switch 230 are implemented as transistors, for example which are controlled via side drivers 222 resp. 232.

The voltage source comprises an element having capacitive properties which, in the example being considered, is the (buffer) capacitor 210. Capacitor 210 is charged by a battery 200 (for example a motor vehicle battery) and a DC voltage converter 201 downstream therefrom. DC voltage converter 201 converts the battery voltage (for example, 12 V) into substantially any other DC voltage (for example 250 V), and charges capacitor 210 to that voltage. DC voltage converter 201 is controlled by means of transistor switch 202 and resistor 203 which is utilized for current measurements taken from a measuring point 630.

For cross check purposes, a further current measurement at a measuring point 650 is allowed by activation IC E as well as by resistors 651, 652 and 653 and a 5 V DC voltage source 654, for example; moreover, a voltage measurement at a measuring point 640 is allowed by activation IC E as well as by voltage dividing resistors 641 and 642.

Finally, a resistor 330 (referred to as total discharging resistor), a stop switch implemented as a transistor 331 (referred to as stop switch), and a diode 332 (referred to as total discharging diode) serve to discharge the piezoelectric elements 10, 20, 30, 40, 50 and 60 (if they happen to be not discharged by the "normal" discharging operation as described further below). Stop switch 331 is preferably closed after "normal" discharging procedures (cycled discharging via discharge switch 230). It thereby connects piezoelectric elements 10, 20, 30, 40, 50 and 60 to ground through resistors 330 and 300, and thus removes any residual charges that might remain in piezoelectric elements 10, 20, 30, 40, 50 and 60. The total discharging diode 332 prevents negative voltages from occurring at the piezoelectric elements 10, 20, 30, 40, 50 and 60, which might in some circumstances be damaged thereby.

Charging and discharging of all the piezoelectric elements 10, 20, 30, 40, 50 and 60 or any particular one is accomplished by way of a single charging and discharging apparatus (common to all the groups and their piezoelectric elements). In the example being considered, the common charging and discharging apparatus comprises battery 200, DC voltage converter 201, capacitor 210, charging switch 220 and discharging switch 230, charging diode 221 and discharging diode 231 and coil 240.

The charging and discharging of each piezoelectric element works the same way and is explained in the following while referring to the first piezoelectric element 10 only.

Figure 4A:
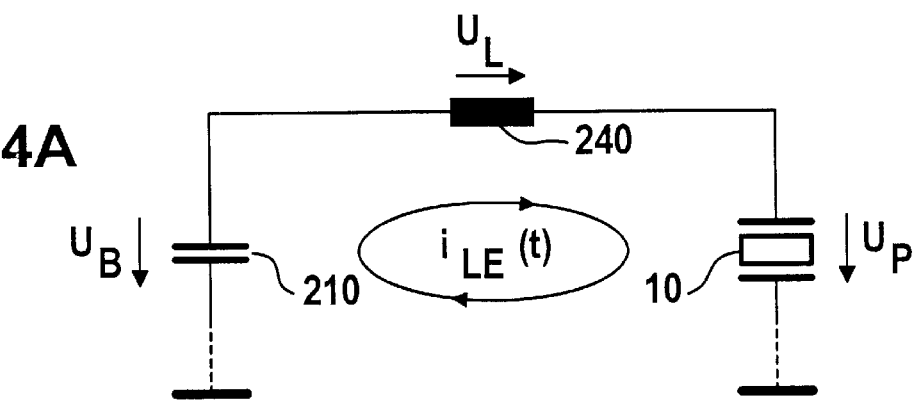
FIG. 4A shows a depiction to explain the conditions occurring during a first charging phase (charging switch 220 closed) in the circuit of FIG. 3.
Figure 4B:
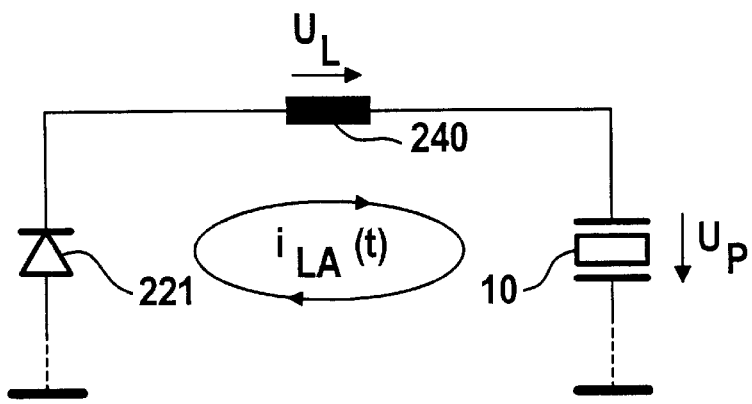
FIG. 4B shows a depiction to explain the conditions occur ring during a second charging phase (charging switch 220 open again) in the circuit of FIG. 3.

The conditions occurring during the charging and discharging procedures are explained with reference to FIG. 4A through FIG. 4D, of which FIG. 4A and FIG. 4B illustrate the charging of piezoelectric element 10, and FIG. 4C and 4D the discharging of piezoelectric element 10.

The selection of one or more particular piezoelectric elements 10, 20, 30, 40, 50 or 60 to be charged or discharged, the charging procedure as described in the following as well as the discharging procedure are driven by activation IC E and control unit D by means of opening or closing one or more of the above introduced switches 11, 21, 31, 41, 51, 61; 310, 320; 220, 230 and 331. The interactions between the elements within the detailed area. A on the on hand and activation IC E and control unit D on the other hand are described in detail further below.

Concerning the charging procedure, firstly any particular piezoelectric element 10, 20, 30, 40, 50 or 60 which is to be charged has to be selected. In order to exclusively charge the first piezoelectric element 10, the branch selector switch 11 of the first branch 110 is closed, whereas all other branch selector switches 21, 31, 41, 51 and 61 remain opened. In order to exclusively charge any other piezoelectric element 20, 30, 40, 50, 60 or in order to charge several ones at the same time they would be selected by closing the corresponding branch selector switches 21, 31, 41, 51 and/or 61.

Then, the charging procedure itself may take place:

Generally, within the example considered, the charging procedure requires a positive potential difference between capacitor 210 and the group selector piezo terminal 14 of the first piezoelectric element 10. However, as long as charging switch 220 and discharging switch 230 are open no charging or discharging of piezoelectric element 10 occurs. In this state, the circuit shown in FIG. 3 is in a steady-state condition i.e. piezoelectric element 10 retains its charge state in substantially unchanged fashion, and no currents flow.

In order to charge the first piezoelectric element 10, charging switch 220 is closed. Theoretically, the first piezoelectric element 10 could become charged just by doing so. However, this would produce large currents which might damage the elements involved. Therefore, the occurring currents are measured at measuring point 620 and switch 220 is opened again as soon as the detected currents exceed a certain limit. Hence, in order to achieve any desired charge on the first piezoelectric element 10, charging switch 220 is repeatedly closed and opened whereas discharging switch 230 remains open.

In more detail, when charging switch 220 is closed, the conditions shown in FIG. 4A occur, i.e. a closed circuit comprising a series circuit made up of piezoelectric element 10, capacitor 210, and coil 240 is formed, in which a current $i_{LE}(t)$ flows as indicated by arrows in FIG. 4A. As a result of this current flow both positive charges are brought to the group selector piezo terminal 14 of the first piezoelectric element 10 and energy is stored in coil 240.

When charging switch 220 opens shortly (for example, a few μs) after it has closed, the conditions shown in FIG. 4B occur: a closed circuit comprising a series circuit made up of piezoelectric element 10, charging diode 221, and coil 240 is formed, in which a current $i_{LA}(t)$ flows as indicated by arrows in FIG. 4B. The result of this current flow is that energy stored in coil 240 flows into piezoelectric element 10. Corresponding to the energy delivery to the piezoelectric element 10, the voltage occurring in the latter, and its external dimensions, increase. Once energy transport has taken place from coil 240 to piezoelectric element 10, the steady-state condition of the circuit, as shown in FIG. 3 and already described, is once again attained.

At that time, or earlier, or later (depending on the desired time profile of the charging operation), charging switch 220 is once again closed and opened again, so that the processes described above are repeated. As a result of the re-closing and re-opening of charging switch 220, the energy stored in piezoelectric element 10 increases (the energy already stored in the piezoelectric element 10 and the newly delivered energy are added together), and the voltage occurring at the piezoelectric element 10, and its external dimensions, accordingly increase.

If the aforementioned closing and opening of charging switch 220 are repeated numerous times, the voltage occurring at the piezoelectric element 10, and the expansion of the piezoelectric element 10, rise in steps.

Once charging switch 220 has closed and opened a predefined number of times, and/or once piezoelectric element 10 has reached the desired charge state, charging of the piezoelectric element is terminated by leaving charging switch 220 open.

Concerning the discharging procedure, in the example considered, the piezoelectric elements 10, 20, 30, 40, 50 and 60 are discharged in groups (G1 and/or G2) as follows:

Firstly, the group selector switch(es) 310 and/or 320 of the group or groups G1 and/or G2 the piezoelectric elements of which are to be discharged are closed (the branch selector switches 11, 21, 31, 41, 51, 61 do not affect the selection of piezoelectric elements 10, 20, 30, 40, 50, 60 for the discharging procedure, since in this case they are bypassed by the branch diodes 12, 22, 32, 42, 52 and 62). Hence, in order to discharge piezoelectric element 10 as a part of the first group G1, the first group selector switch 310 is closed.

Figure 4C:
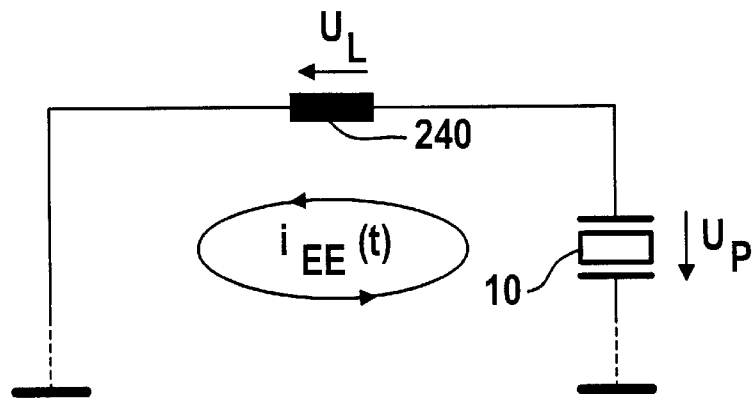
FIG. 4C shows a depiction to explain the conditions occurring during a first discharging phase (discharging switch 230 closed) in the circuit of FIG. 3.

When discharging switch 230 is closed, the conditions shown in FIG. 4C occur: a closed circuit comprising a series circuit made up of piezoelectric element 10 and coil 240 is formed, in which a current $i_{EE}(t)$ flows as indicated by arrows in FIG. 4C. The result of this current flow is that the energy (a portion thereof) stored in the piezoelectric element is transported into coil 240. Corresponding to the energy transfer from piezoelectric element 10 to coil 240, the voltage occurring at the piezoelectric element 10, and its external dimensions, decrease.

Figure 4D:
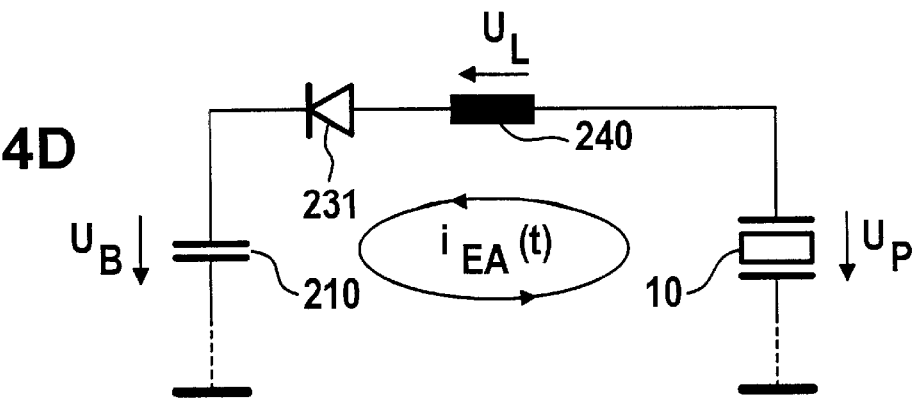
FIG. 4D shows a depiction to explain the conditions occurring during a second discharging phase (discharging switch 230 open again) in the circuit of FIG. 3.

When discharging switch 230 opens shortly (for example, a few μs) after it has closed, the conditions shown in FIG. 4D occur: a closed circuit comprising a series circuit made up of piezoelectric element 10, capacitor 210, discharging diode 231, and coil 240 is formed, in which a current $i_{EA}(t)$ flows as indicated by arrows in FIG. 4D. The result of this current flow is that energy stored in coil 240 is fed back into capacitor 210. Once energy transport has taken place from coil 240 to capacitor 210, the steady-state condition of the circuit, as shown in FIG. 3 and already described, is once again attained.

At that time, or earlier, or later (depending on the desired time profile of the discharging operation), discharging switch 230 is once again closed and opened again, so that the processes described above are repeated. As a result of the re-closing and re-opening of discharging switch 230, the energy stored in piezoelectric element 10 decreases further, and the voltage occurring at the piezoelectric element, and its external dimensions, also accordingly decrease.

If the aforementioned closing and opening of discharging switch 230 are repeated numerous times, the voltage occurring at the piezoelectric element 10, and the expansion of the piezoelectric element 10, decrease in steps.

Once discharging switch 230 has closed and opened a predefined number of times, and/or once the piezoelectric element has reached the desired discharge state, discharging of the piezoelectric element 10 is terminated by leaving discharging switch 230 open.

The interaction between activation IC E and control unit D on the one hand and the elements within the detailed area A on the other hand is performed by control signals sent from activation IC E to elements within the detailed area A via branch selector control lines 410, 420, 430, 440, 450, 460, group selector control lines 510, 520, stop switch control line 530, charging switch control line 540 and discharging switch control line 550 and control line 560. On the other hand, there are sensor signals obtained on measuring points 600, 610, 620, 630, 640, 650 within the detailed area A which are transmitted to activation IC E via sensor lines 700, 710, 720, 730, 740, 750.

The control lines are used to apply or not to apply voltages to the transistor bases in order to select piezoelectric elements 10, 20, 30, 40, 50 or 60, to perform charging or discharging procedures of single or several piezoelectric elements 10, 20, 30, 40, 50, 60 by means of opening and closing the corresponding switches as described above. The sensor signals are particularly used to determine the resulting voltage of the piezoelectric elements 10, 20 and 30, resp. 40, 50 and 60 from measuring points 600 resp. 610 and the charging and discharging currents from measuring point 620. The control unit D and the activation IC E are used to combine both kinds of signals in order to perform an interaction of both as will be described in detail now while referring to FIGS. 3 and 5.

As is indicated in FIG. 3, the control unit D and the activation IC E are connected to each other by means of a parallel bus 840 and additionally by means of a serial bus 850. The parallel bus 840 is particularly used for fast transmission of control signals from control unit D to the activation IC E, whereas the serial bus 850 is used for slower data transfer.

Figure 5:
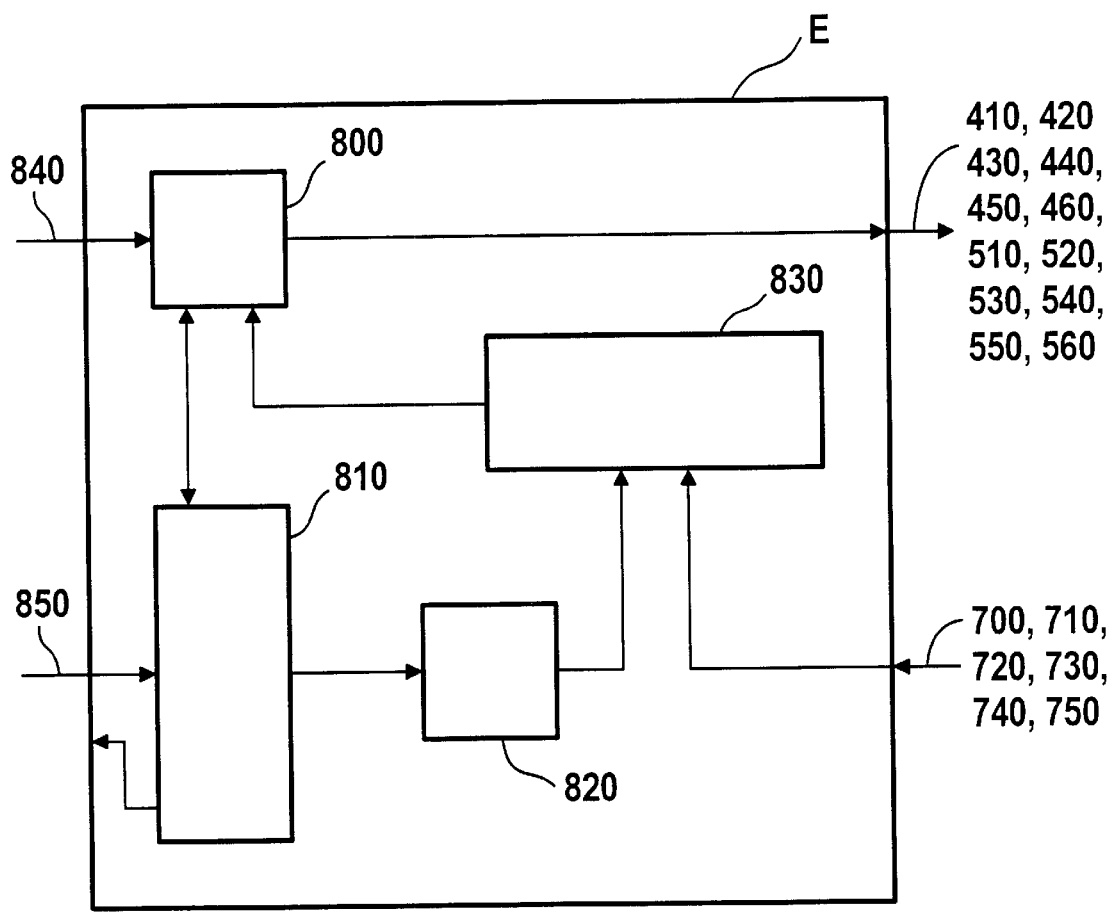
FIG. 5 shows a block diagram of components of the activation IC E which is also shown in FIG. 3.

In FIG. 5 some components are indicated, which the activation IC E comprises: a logic circuit 800, RAM memory 810, digital to analog converter system 820 and comparator system 830. Furthermore, it is indicated that the fast parallel bus 840 (used for control signals) is connected to the logic circuit 800 of the activation IC E, whereas the slower serial bus 850 is connected to the RAM memory 810. The logic circuit 800 is connected to the RAM memory 810, to the comparator system 830 and to the signal lines 410, 420, 430, 440, 450 and 460; 510 and 520; 530; 540, 550 and 560. The RAM memory 810 is connected to the logic circuit 800 as well as to the digital to analog converter system 820. The digital to analog converter system 820 is further connected to the comparator system 830. The comparator system 830 is further connected to the sensor lines 700 and 710; 720; 730, 740 and 750 and—as already mentioned—to the logic circuit 800.

The above listed components may be used in a charging procedure for example as follows:

By means of the control unit D a particular piezoelectric element 10, 20, 30, 40, 50 or 60 is determined which is to be charged to a certain target voltage. Hence, firstly the value of the target voltage (expressed by a digital number) is transmitted to the RAM memory 810 via the slower serial bus 850. The target voltage call be, for example, the value for $U_{opt}$ used in a main injection. Later or simultaneously, a code corresponding to the particular piezoelectric element 10, 20, 30, 40, 50 or 60 which is to be selected and the address of the desired voltage within the RAM memory 810 is transmitted to the logic circuit 800 via the parallel bus 840. Later on, a strobe signal is sent to the logic circuit 800 via the parallel bus 840 which gives the start signal for the charging procedure.

The start signal firstly causes the logic circuit 800 to pick up the digital value of the target voltage from the RAM memory 810 and to put it on the digital to analog converter system 820 whereby at one analog exit of the converters 820 the desired voltage occurs. Moreover, said analog exit (not shown) is connected to the comparator system 830. In addition hereto, the logic circuit 800 selects either measuring point 600 (for any of the piezoelectric elements 10, 20 or 30 of the first group G1) or measuring point 610 (for any of the piezoelectric elements 40, 50 or 60 of the second group G2) to the comparator system 830. Resulting thereof, the target voltage and the present voltage at the selected piezoelectric element 10, 20, 30, 40, 50 or 60 are compared by the comparator system 830. The results of the comparison, i.e. the differences between the target voltage and the present voltage, are transmitted to the logic circuit 800. Thereby, the logic circuit 800 can stop the procedure as soon as the target voltage and the present voltage are equal to one another.

Secondly, the logic circuit 800 applies a control signal to the branch selector switch 11, 21, 31, 41, 51 or 61 which corresponds to any selected piezoelectric element 10, 20, 30, 40, 50 or 60 so that the switch becomes closed (all branch selector switches 11, 21, 31, 41, 51 and 61 are considered to be in an open state before the onset of the charging procedure within the example described). Then, the logic circuit 800 applies a control signal to the charging switch 220 so that the switch becomes closed. Furthermore, the logic circuit 800 starts (or continues) measuring any currents occurring on measuring point 620. Hereto, the measured currents are compared to any predefined maximum value by the comparator system 830. As soon as the predefined maximum value is achieved by the detected currents, the logic circuit 800 causes the charging switch 220 to open again.

Again, the remaining currents at measuring point 620 are detected and compared to any predefined minimum value. As soon as said predefined minimum value is achieved, the logic circuit 800 causes the charging switch 220 to close again and the procedure starts once again.

The closing and opening of the charging switch 220 is repeated as long as the detected voltage at measuring point 600 or 610 is below the target voltage. As soon as the target voltage is achieved, the logic circuit stops the continuation of the procedure.

The discharging procedure takes place in a corresponding way: Now the selection of the piezoelectric element 10, 20, 30, 40, 50 or 60 is obtained by means of the group selector switches 310 resp. 320, the discharging switch 230 instead of the charging switch 220 is opened and closed and a predefined minimum target voltage is to be achieved.

The timing of the charging and discharging operations and the holding of voltage levels in the piezoelectric elements 10, 20, 30, 40, 50 or 60, as for example, the time of a main injection, can be according to a valve stroke, as shown, for example, in FIG. 3.

It is to be understood that the above given description of the way charging or discharging procedures take placeare exemplary only. Hence, any other procedure which utilizes the above described circuits or other circuits might match any desired purpose and any corresponding procedure may be used in place of the above described example.

The target voltages for activating the piezoelectric elements are stored in RAM memory 810. The values stored in the RAM memory 810 include the time period calculations of the metering unit, and initial values for, for example, $U_{opt}$ used as target voltages in charging and discharging procedures, as described above.

The $U_{opt}$ values can change as a function of operating characteristics of the fuel injection system, such as, for example, fuel pressure, as fully described in co-pending application titled "Method and Apparatus for Charging a Piezoelectric Element" (attorney docket number 10744/11), filed on the same day as this application. Thus, the values stored in the RAM memory 810 include delta values added to or subtracted from the set initial $U_{opt}$ voltages, as a function of measured fuel pressure, as described in co-pending application titled "Method and Apparatus for Charging a Piezoelectric Element" (attorney docket number 10744/11), filed on the same day as this application. The stored target voltages can also be modified and continuously optimized as described in co-pending application titled "Online Optimization of Injection Systems Having Piezoelectric Elements" (attorney docket number 10744/11), filed on the same day as this application.

The present invention for detecting a load decrease while driving the piezoelectric elements can be readily implemented using the embodiment described above. As discussed above, the normal capacitive load of a piezoelectric element prevents the voltage across the piezoelectric element from changing instantaneously. The present invention takes advantage of this characteristic to detect a decrease in the load by monitoring the time that it takes for a target voltage to be reached.

If a drop in the piezoelectric element load occurs before or during a charging attempt, the current flow is interrupted. Thus there will be virtually no voltage drop across the inductance 240 and, when the charging switch is closed, the entire applied voltage from the buffer circuit will fall across the voltage divider corresponding to measuring point 600 or 610 (depending on which piezoelectric element group, G1 or G2, is presently being cycled). In this way the target voltage will be met and exceeded more quickly than if the full electrical load of the piezoelectric element were present.

If the drop in load occurs before or during a discharging attempt no current flows from the faulty piezoelectric element and, when the discharge switch is closed, there will be no voltage across the voltage divider corresponding to measuring points 600 or 610. Thus the target voltage for the discharging phase will be quickly met, or surpassed, when a load drop occurs during a discharging cycle, and the voltage at measuring points 600 and 610 goes to zero.

If a drop in load occurs during a charging or discharging operation, for example, after the minimum time threshold is met, a drop in the load will not be detected during that charging or discharging operation. Rather, the drop in load would be detected during the next charging or discharging attempt.

The charging or discharging phase begin when either the charging switch 220 or discharging switch 230, respectively, closes. Logic circuit 800 selects voltage monitoring point 600 or 610 (depending on whether a piezoelectric element in the first group G1 or the second group G2 is being charged) to be compared with a target voltage by comparator system 830. Utilizing the clock in the metering unit, logic circuit 800 stores the time at which the charging switch 220 or discharging switch 230 is closed to begin the respective charging or discharging phase of the piezoelectric element. Monitoring points 600 and 610 indicate the respective voltages (via a voltage divider) that are present across their respective piezoelectric groups as the charging or discharging phase begins. The difference between the target voltage and the present voltage (measured at measuring point 600 or 610) is transmitted by comparator system 830 to logic circuit 800. When the present voltage reaches the target voltage the logic circuit 800 can stop the procedure and calculate the time interval for reaching the target voltage from the time that the present charging or discharging phase began.

The logic circuit 800 can then compare the actual charging or discharging time interval with a predetermined minimum time interval. If the actual time interval is less than the predetermined minimum time interval, a load decrease has occurred in the piezoelectric element and an error signal is generated. The error signal can be used to create an entry in an error memory in the activation IC E, identifying the particular faulty piezoelectric element. Further, the control unit D and the activation IC E can be programmed to cease initiating the charging and discharging phases for the faulty piezoelectric element upon the occurrence of such an error signal.

When a load drop occurs with a piezoelectric element that is at least partially charged, it may not be possible to discharge the piezoelectric element through the discharging switch 230, either because the control unit has discontinued the discharge cycle, or because of a problem in the piezoelectric element driving circuit. In that case the piezoelectric element may be discharged through the respective branch resistor 13, 23, 33, 43, 53, or 63.

What is claimed is:

1. An apparatus for detecting a load decrease when driving a piezoelectric element (10, 20, 30, 40, 50, or 60), comprising:

a logic circuit (800) configured to generate an error signal when the piezoelectric element (10, 20, 30, 40, 50, or 60) reaches a target voltage more quickly than a predetermined minimum time interval.

2. The apparatus as defined in claim 1 characterized in that the logic circuit (800) controls one or more switches to apply a charging or, a discharging circuit across the piezoelectric element (10, 20, 30, 40, 50, or 60) to reach the target voltage.

3. The apparatus as defined in claim 1, characterized in that a voltage comparator receives a voltage measurement from across the piezoelectric element (10, 20, 30, 40, 50, or 60), and provides a difference signal to the logic circuit representing the difference between the voltage measurement across the piezoelectric element (10, 20, 30, 40, 50, or 60) and the target voltage.

4. The apparatus as defined in claim 1 characterized in that a clock circuit provides a timing signal to the logic circuit, the timing signal being used by the logic circuit to measure a time interval for the piezoelectric element (10, 20, 30, 40, 50, or 60) to reach the target voltage and to compare the time interval against the predetermined minimum time interval.

5. The apparatus as defined in claim 4, characterized in that the difference signal indicates whether or not the voltage measurement across the piezoelectric element is higher than the target voltage.

6. The apparatus as defined in claim 3, characterized in that the voltage comparator receives the present voltage measurement from a measuring point in a voltage divider circuit.

7. The apparatus as defined in claim 1, characterized in that the piezoelectric element (10, 20, 30, 40, 50 or 60) is an actuator in a fuel injection system.

8. The apparatus as defined in claim 1, characterized in that the error signal is recorded as an entry in an error memory.

9. A method for detecting a load decrease when driving a piezoelectric element (10, 20, 30, 40, 50, 60) by applying a circuit to a piezoelectric element (10, 20, 30, 40, 50, or 60) to charge or discharge it to a target voltage, characterized in that the time it takes for the piezoelectric element (10, 20, 30, 40, 50, or 60) to reach the target voltage is monitored, and an error signal is generated when the piezoelectric element (10, 20, 30, 40, 50, or 60) reaches the target voltage more quickly than a predetermined minimum time interval.

10. The method as defined in claim 9 characterized in that the piezoelectric element (10, 20, 30, 40, 50, or 60) is an actuator in a fuel injection system.

11. An apparatus for detecting a load decrease when driving a piezoelectric element, comprising:

a logic circuit configured to generate an error signal when the piezoelectric element reaches a target voltage more quickly than a predetermined minimum time interval.

12. The apparatus according to claim 11, wherein the logic circuit is configured to control at least one switch for applying one of a charging circuit and a discharging circuit across the piezoelectric element to reach the target voltage.

13. The apparatus according to claim 11, further comprising:

a voltage comparator configured to receive a voltage measurement across the piezoelectric element and to provide a difference signal to the logic circuit corresponding to a difference between the voltage measurement and the target voltage.

14. The apparatus according to claim 13, wherein the difference signal indicates whether the voltage measurement is higher than the target voltage.

15. The apparatus according to claim 13, wherein the voltage comparator is configured to receive a present voltage measurement from a measuring point in a voltage divider circuit.

16. The apparatus according to claim 11, further comprising:

a clock circuit configured to provide a timing signal to the logic circuit;

wherein the logic circuit is configured to use the timing signal to measure a time required for the piezoelectric element to reach the target voltage, and the logic circuit is configured to compare the measured time interval to the predetermined minimum time interval.

17. The apparatus according to claim 11, wherein the piezoelectric element includes an actuator in a fuel injection System.

18. The apparatus according to claim 11, further comprising an arrangement configured to record the error signal as an entry in an error memory.

19. A method for detecting a load decrease when driving a piezoelectric element, comprising:

applying a circuit to a piezoelectric element to one of charge and discharge the piezoelectric element to a target voltage;

monitoring a time required for the piezoelectric element to reach the target voltage; and generating an error signal when the piezoelectric element reaches the target voltage more quickly than a predetermined minimum time interval.

20. The method according to claim 19, wherein the piezoelectric element includes an actuator in a fuel injection system.

* * * * *